United States Patent
Schneider

(10) Patent No.: US 12,156,611 B2
(45) Date of Patent: Dec. 3, 2024

(54) BEVERAGE MAKER AND METHOD FOR OPERATING A BEVERAGE MAKER

(71) Applicant: WMF GmbH, Geislingen/Steige (DE)

(72) Inventor: Oliver Schneider, Geislingen/Steige (DE)

(73) Assignee: WMF GmbH (DE)

( * ) Notice: Subject to any disclaimer, the term of this patent is extended or adjusted under 35 U.S.C. 154(b) by 106 days.

(21) Appl. No.: 17/630,041

(22) PCT Filed: Jul. 21, 2020

(86) PCT No.: PCT/EP2020/070525
§ 371 (c)(1),
(2) Date: Jan. 25, 2022

(87) PCT Pub. No.: WO2021/018666
PCT Pub. Date: Feb. 4, 2021

(65) Prior Publication Data
US 2022/0273133 A1   Sep. 1, 2022

(30) Foreign Application Priority Data

Jul. 30, 2019  (DE) .......................... 102019211272.2

(51) Int. Cl.
*A47J 31/60*    (2006.01)
*A47J 31/44*    (2006.01)
(Continued)

(52) U.S. Cl.
CPC ........... *A47J 31/60* (2013.01); *A47J 31/4428* (2013.01); *A47J 31/525* (2018.08); *A47J 31/54* (2013.01); *B08B 9/027* (2013.01)

(58) Field of Classification Search
None
See application file for complete search history.

(56) References Cited

U.S. PATENT DOCUMENTS

2004/0026449 A1* 2/2004 Goodman ................ B67D 1/16
222/108
2008/0163896 A1   7/2008 Ioannone
(Continued)

FOREIGN PATENT DOCUMENTS

DE  102011077435 A1  12/2012
DE  102013112130 A1   5/2015
EP      1911382 A1    4/2008

OTHER PUBLICATIONS

International Search Report for Application No. PCT/EP2020/070525 mailed Oct. 21, 2020, pp. 1-3.

*Primary Examiner* — Mikhail Kornakov
*Assistant Examiner* — Ryan L Coleman
(74) *Attorney, Agent, or Firm* — Lerner David LLP

(57) ABSTRACT

A beverage maker and a method for operating a beverage maker are provided, wherein the. beverage maker includes a discharge channel having a sensor configured to detect a cleaning agent in water and a control unit configured to receive measured values from the sensor and to take the received measured values as a basis for regulating a water intake from the water source. The method includes regulating water intake from the water source based upon the measured values from the sensor in the dis-charge channel to ensure that only an amount of water necessary for re-moving remaining cleaning agent from the beverage maker is utilized for flushing.

6 Claims, 1 Drawing Sheet

(51) Int. Cl.
    *A47J 31/52*    (2006.01)
    *A47J 31/54*    (2006.01)
    *B08B 9/027*    (2006.01)

(56) References Cited

U.S. PATENT DOCUMENTS

| | | | |
|---|---|---|---|
| 2009/0095165 A1* | 4/2009 | Nosler | A47J 31/007 |
| | | | 426/433 |
| 2011/0049187 A1 | 3/2011 | Boekhoorn et al. | |
| 2013/0186283 A1 | 7/2013 | Koch | |
| 2017/0273501 A1* | 9/2017 | Gaillard | A47J 31/60 |

* cited by examiner

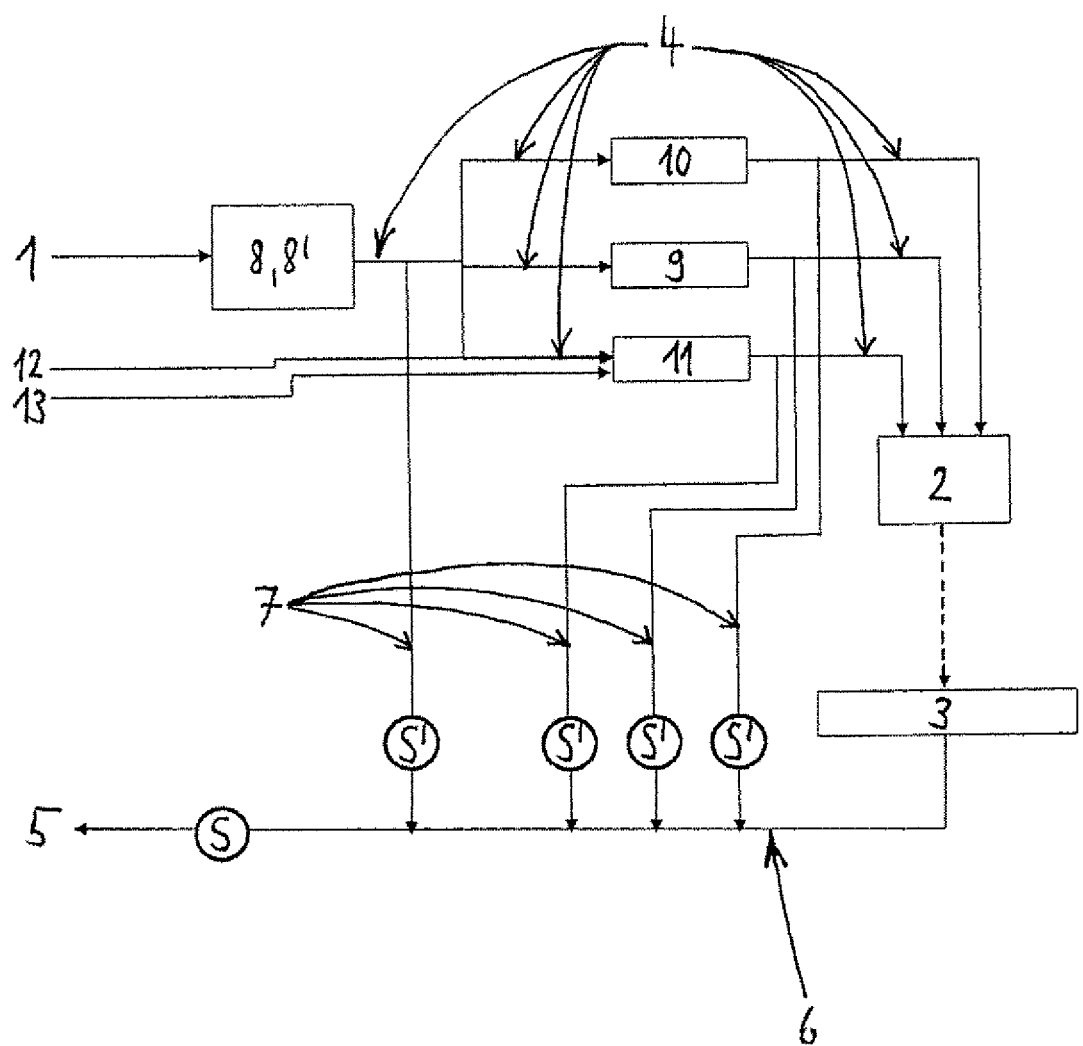

BEVERAGE MAKER AND METHOD FOR OPERATING A BEVERAGE MAKER

CROSS-REFERENCE TO RELATED APPLICATIONS

The present application is a national phase entry under 35 U.S.C. § 371 of International Application No. PCT/EP2020/070525, filed Jul. 21, 2020, which claims priority from German Patent Application No. 102019211272.2 filed Jul. 30, 2019, all of which are incorporated herein by reference.

A beverage maker and a method of operating a beverage maker are provided. The beverage maker is characterized in that its discharge channel has a sensor suitable for detecting a cleaning agent in water.

BACKGROUND OF THE INVENTION

To ensure the operational readiness and the beverage quality in coffee makers, in particular in automatic coffee makers, components of these machines that come into contact with the ingredients for the beverages or with the finished beverages require cyclic cleaning processes. The beverages are prevalently coffee, but also milk and milk froth, hot chocolate, syrup, and/or sugar. A descaling of the hot water and steam generators is furthermore also necessary with these beverage makers.

There are different cleaning agents and descaling agents for the different paths such as coffee, milk, hot chocolate, syrup, hot water, or steam. They are introduced into the respective system or into the respective path in solid or liquid form (optionally in a concentrated form) in a cleaning mode. Solid cleaning agents are either dissolved there or can be diluted in dissolved form to a required concentration. The cleaning agents are then conducted through the components and lines of the beverage makers to be cleaned. The dwell times required for an optimum cleaning result are known in the prior art here. It is additionally known in the prior art to conduct the cleaning agents through the components or lines of the beverage maker multiple times to achieve a better cleaning result.

At the end of the cleaning process, the cleaning agent is conducted out of the beverage maker and the components and lines that had come into contact with the cleaning agent are flushed until all the cleaner residues have been reliably removed from the beverage maker. It is known in the prior art to carry out the flushing with cold water or with hot water right up to with water vapor. The water vapor provides the advantage of disinfection and the possibility of blowing the lines of the beverage maker clear. With commercial beverage makers, the discharging as a rule takes place via a central discharge of the machine that is connected to the drain of the house installation.

The required amount of flushing water to remove cleaning agent completely from the beverage maker can vary from beverage maker to beverage maker or from cleaning cycle to cleaning cycle (depending on how dirty the coffee maker is). A less used beverage maker, for example, has hardly any to no residues or films on the surfaces of the lines and components to be flushed to which cleaning agent can attach. With such a beverage maker, less flushing water is required than with a frequently used beverage maker whose lines and components have more residues or films to which cleaning agent can attach. The situation is similar on descaling processes since lime partially neutralizes the descaler.

To be able to ensure a complete flushing out of the cleaning agent in all conceivable operating situations (e.g. accidental overdosing of cleaning agent or accumulation of cleaning agent residues in dead spaces and/or in poorly flowed through regions), it is customary in beverage makers from the prior art to use an excessively large amount of flushing liquid to preclude a risk to the user of the beverage maker from residues of flushing agent in the beverage maker.

In a large number of cases, a multiple of the amount actually required for flushing is used, which can unnecessarily extend a time up to the next beverage dispensing and is neither economical nor ecological due to an unnecessary high water consumption.

BRIEF SUMMARY OF THE INVENTION

Starting from this, it was the object of the present information to provide a beverage maker that enables a reduction of the flushing water amount and that can simultaneously ensure that the user is not exposed to any safety risk due to residual cleaning agent in the beverage maker.

The object is achieved by the beverage maker having the features claimed herein and by the method having the features claimed herein. The dependent claims show advantageous further developments.

A beverage maker is provided in accordance with the invention comprising
  a) a water source;
  b) a heating device (preferably a heating device selected from the group consisting of a hot water boiler, a steam boiler, an instant water heater, a heat exchanger, and combinations thereof);
  c) a beverage outlet;
  d) a drip tray below the beverage outlet (i.e. in the direction of gravity);
  e) a beverage channel that fluidically connects the water source to the beverage outlet;
  f) a discharge that is not identical to the beverage outlet; and
  g) a discharge channel that fluidically connects an inner space of the drip tray to the discharge,
  characterized in that the discharge channel has a sensor that is suitable for detecting a cleaning agent in water; and in that the beverage maker contains a control unit that is configured to receive measured values from the sensor and to regulate a water removal from the water source on the basis of the measured values received.

In the presented beverage maker, the sensor for detecting a cleaning agent is seated in the discharge channel, i.e. in a channel between the drip tray and the discharge. A residual concentration of cleaning agent at the end of a cleaning process (e.g. of an automatically running cleaning program) can thus be detected directly upstream of the discharge, i.e. at the last location of cleaning agent in the beverage maker. It can thus be ensured that the flushing water supply from the water source of the beverage maker in the direction of the cleaning agent outlet is only stopped when a specific measured value at the sensor (threshold) is fallen below.

This feedback control makes it possible to flush only with the exactly required amount of water to completely remove the cleaning agent from the beverage maker or to lower its residual concentration in the beverage maker to a value that is harmless for the user of the beverage maker. The beverage maker can thus ensure that there is no risk from residual cleaning agent in the beverage maker for the user of the beverage maker.

A considerable saving of water results by the use of the beverage maker in accordance with the invention over cleaning methods in the prior art that, for safety reasons, flush with an unnecessarily high amount of water at the end of the cleaning cycle. This has economic advantages for the user or operator of the beverage maker since less water is consumed and the times up to the next possible dispensing of a beverage ("dead times") are shortened. Due to the lower water consumption, ecological advantages that are becoming increasingly important, in particular in view of an increasing tendency to water shortages in more and more regions of the earth, result for the environment.

The sensor can be located at any desired point of the discharge channel, i.e. at any desired point on the path between the discharge and the drip tray. The sensor is preferably arranged at an inlet opening into the discharge channel. The sensor is particularly preferably arranged at an inlet opening from the inner space of the drip tray into the discharge channel. The sensor is furthermore particularly preferably arranged at an inlet opening from a connection channel into the discharge channel, with the connection channel fluidically connecting the beverage channel to the discharge channel. The sensor is very particularly preferably arranged downstream of the (respective) inlet opening.

The closer the sensor is arranged to the discharge of the beverage maker, the better it can be ensured that residual cleaning agent has completely left the discharge channel of the beverage maker during a flushing process or that the remaining residual concentration of cleaning agent is below a specific threshold value, i.e. is harmless.

In a further preferred embodiment, the discharge channel is fluidically connected to the beverage channel upstream of the sensor via at least one connection channel. The at least one connection channel is preferably connected to the beverage channel downstream of the heating device of the beverage maker, with the heating device preferably being selected from the group consisting of a hot water boiler, a steam boiler, an instantaneous water heater, a heat exchanger, and combinations thereof. The at least one connection channel can additionally be connected to the beverage channel downstream of a brewing unit of the beverage maker. Apart from this, the at least one connection channel can be connected to the beverage channel downstream of a mixer of the beverage maker. It is also possible that the at least one connection channel is connected to the beverage channel downstream of a milk frothing device of the beverage maker. The at least one connection channel can furthermore be connected to the beverage channel upstream of the beverage outlet. A valve (e.g. a two-way valve) can be arranged at the connection points with the beverage channel. The advantage of these embodiments is that in the case of a cleaning of the beverage maker, a complete cleaning of the total components located in the beverage channel of the beverage maker does not necessarily have to take place, but individual components (e.g. only the heating device) can be directly cleaned, which saves cleaning agent and can shorten the cleaning time ("dead time").

A further advantage of the connection channel (preferably of a plurality of such connection channels) in the beverage maker is that, on the cleaning of the individual components, the cleaning agent does not have to be output via the beverage outlet. For example, an acidic cleaning agent (e.g. a descaling agent) has a certain corroding effect that can represent a safety risk in the case of an output of such a cleaning agent via the beverage outlet (e.g. a risk of burning via a spraying of milk at the outlet and/or a confusing of the agent with a beverage by a user of the beverage maker).

The at least one connection channel of the beverage maker has, in a preferred embodiment, at least one further sensor that is suitable for detecting a cleaning agent in water, with the control unit being configured to receive measured values from the at least one further sensor and to regulate a water removal from the water source on the basis of the measured values received. The advantage of this embodiment is that, in the event of a simultaneous cleaning of a plurality of components of the beverage maker, it is simultaneously possible to monitor whether cleaning agent can pass through every single component at all and when a harmless value of cleaning agent is reached on the flushing (with water) for every single component.

The at least one further sensor of the beverage maker is preferably arranged at an inlet opening of the beverage channel into the connection channel. The at least one further sensor is particularly preferably arranged upstream of the inlet opening of the connection channel into the discharge channel.

The control unit can be configured to stop the liquid removal from the water reservoir when the measured values from the sensor, optionally additionally from the at least one further sensor (in at least one connection channel), fall below a certain threshold.

The control unit can furthermore be configured to regulate a liquid removal from the cleaning agent reservoir on the basis of the measured values from the sensor, optionally additionally on the basis of measured value from at least one further sensor (in at least one connection channel), in particular such that the liquid removal from the cleaning agent reservoir is reduced or stopped when the measured values from the sensor, optionally additionally from at least one further sensor, exceed a certain threshold.

The beverage maker can include a display unit and/or a memory unit, with the control unit preferably being configured to cause a falling below and/or exceeding of the measured values measured by the sensor, optionally additionally by at least one further sensor (in at least one connection channel), to be displayed on the display unit and/or to be stored in the memory unit, particularly preferably, depending on the measured values, as a successful cleaning process or as a defective cleaning process. The advantage here is that the cleaning process is visualized and documented and that it is thus signaled to the user and also to service engineers whether a cleaning process was successful.

The control unit can be configured, when a cleaning program is started on the beverage maker and the measured value of the sensor thereupon falls below a preceding threshold value, to display a prompt at a display unit of the beverage maker, to supply cleaning agent to the beverage maker and/or to store an underdosing of cleaning agent during a cleaning program as an event in a memory unit of the beverage maker. The control unit can optionally be configured to additionally restrict an operability of the beverage maker, preferably the possibility of outputting a beverage.

The control unit can furthermore be configured, when a cleaning program is started on the beverage maker and the measured value of the sensor is thereupon in a predefined value range, to display the message that a cleaning program is being carried out on a display unit of the beverage maker, and/or to store a correct dosing of cleaning agent during a cleaning program as an event in a memory unit of the beverage maker.

The control unit can be configured, when a cleaning program is started on the beverage maker and the measured value of the sensor thereupon exceeds a preceding threshold value, to display a prompt to not (no longer) supply cleaning agent to the beverage maker on a display unit of the beverage maker, and/or to store an underdosing of cleaning agent during a cleaning program as an event in a memory unit of the beverage maker. The control unit can optionally be configured to additionally restrict an operability of the beverage maker, preferably the possibility of outputting a beverage.

The sensor of the beverage maker, optionally at least one further sensor of the beverage maker, can be selected from the group consisting of conductivity sensor ("conductivity" relates to the electrical conductivity), pH sensor, capacitive sensor, and combinations thereof. It is preferably a conductivity sensor.

In accordance with the invention, a method of operating a beverage maker is furthermore provided, said method comprising the steps
   a) providing a beverage maker including a water source, a heating device, a beverage outlet, a drip tray below the beverage outlet, a beverage channel fluidically connecting the water source to the beverage outlet, a discharge not identical to the beverage outlet, and a discharge channel that fluidically connects an inner space of the drip tray to the discharge and that has a sensor for detecting a cleaning agent in water; and
   b) detecting measured values of the sensor;
   c) receiving measured values of the sensor from a control unit of the beverage maker; and
   d) regulating a water removal from the water source by the control unit, with the regulation taking place on the basis of the measured values received by the control unit.

The sensor can be located at any desired point of the discharge channel, i.e. at any desired point on the path between the discharge and the drip tray. The sensor is preferably arranged at an inlet opening into the discharge channel. The sensor is particularly preferably arranged at an inlet opening from the inner space of the drip tray into the discharge channel. The sensor is furthermore particularly preferably arranged at an inlet opening from a connection channel into the discharge channel, with the connection channel fluidically connecting the beverage channel to the discharge channel. The sensor is very particularly preferably arranged downstream of the (respective) inlet opening.

The closer the sensor is arranged to the discharge of the beverage maker, the better it can be ensured that residual cleaning agent has completely left the discharge channel of the beverage maker during a flushing process or that the remaining residual concentration of cleaning agent is below a specific threshold value, i.e. is harmless.

In a preferred embodiment, the discharge channel is fluidically connected to the beverage channel upstream of the sensor via at least one connection channel. The at least one connection channel is preferably connected to the beverage channel downstream of the heating device of the beverage maker, with the heating device preferably being selected from the group consisting of a hot water boiler, a steam boiler, an instantaneous water heater, a heat exchanger, and combinations thereof. The at least one connection channel can additionally be connected to the beverage channel downstream of a brewing unit of the beverage maker. Apart from this, the at least one connection channel can be connected to the beverage channel downstream of a mixer of the beverage maker. It is also possible that the at least one connection channel is connected to the beverage channel downstream of a milk frothing device of the beverage maker. The at least one connection channel can furthermore be connected to the beverage channel upstream of the beverage outlet. A valve (e.g. a two-way valve) can be arranged at the connection points with the beverage channel.

In a further preferred embodiment, the at least one connection channel of the beverage maker has at least one further sensor that is suitable for detecting a cleaning agent in water, with the control unit being configured to receive measured values from the at least one further sensor and to regulate a water removal from the water source on the basis of the measured values received.

The at least one further sensor of the beverage maker is preferably arranged at an inlet opening of the beverage channel into the connection channel. The at least one further sensor is particularly preferably arranged upstream of the inlet opening of the connection channel into the discharge channel.

The method can be characterized in that the liquid removal from the water reservoir of the beverage maker is stopped by the control unit when the measured values from the sensor, optionally additionally from the at least one further sensor (in at least one connection channel), fall below a certain threshold.

In the method, a liquid removal from the cleaning agent reservoir can be regulated on the basis of the measured values from the sensor, optionally additionally from at least one further sensor (in at least one connection channel), in particular such that the liquid removal from the cleaning agent reservoir is reduced or stopped when the measured values from the sensor, optionally additionally from at least one further sensor (in at least one connection channel), exceed a specific threshold.

The beverage maker can include or be equipped with a display unit and/or a memory unit, with the control unit causing a falling below and/or an exceeding of the measured values measured by the sensor, optionally by at least one further sensor (in at least one connection channel) to be displayed on the display unit, and/or to be stored in the memory unit, particularly preferably, depending on the measured values, as a successful cleaning process or as a defective cleaning process.

The method can be characterized in that, when a cleaning program is started on the beverage maker and the measured value of the sensor thereupon falls below a predefined threshold value, the control unit causes a prompt to supply cleaning agent to the beverage maker to be displayed on a display unit of the beverage maker, and/or an underdosing of the cleaning unit during a cleaning program to be stored as an event in a memory unit of the beverage maker. The control unit can optionally cause an operability of the beverage maker to be restricted, preferably the possibility of outputting a beverage to be restricted.

The method can be characterized in that, when a cleaning program is started on the beverage maker and the measured value of the sensor is thereupon in a predefined value range, the control unit causes the message that a cleaning program is being carried out to be displayed on a display unit of the beverage cleaning unit, and/or a correct dosing of cleaning agent during a cleaning program to be stored as an event in a memory unit of the beverage maker.

The method can additionally be characterized in that, when a cleaning program is started on the beverage maker and the measured value of the sensor thereupon exceeds a predefined threshold value, the control unit causes a prompt not to supply cleaning agent to the beverage maker to be displayed on a display unit of the beverage maker, and/or an overdosing of cleaning agent during a cleaning program to be stored as an event in a memory unit of the beverage maker. The control unit can optionally cause an operability of the beverage maker to be restricted, preferably the possibility of outputting a beverage to be restricted.

The sensor, optionally at least one further sensor of the beverage maker, can be selected from the group consisting of conductivity sensor ("conductivity" relates to the electrical conductivity), pH sensor, capacitive sensor, and combinations thereof. The sensor is preferably a conductivity sensor.

In a preferred embodiment, the method is characterized in that it is carried out using a beverage maker in accordance with the invention.

The subject matter in accordance with the invention will be explained in more detail with reference to the following FIGURE and the following example without intending to restrict it to the specific embodiments shown here.

BRIEF DESCRIPTION OF THE DRAWING

The FIGURE shows a schematic representation of the fluidic lines in a beverage maker in accordance with the invention.

DETAILED DESCRIPTION OF THE INVENTION

The beverage maker includes a beverage channel 4 that fluidically connects the water source 1 (e.g. a water connection) to the beverage outlet 2. In this embodiment, a heating device comprising a hot water boiler 8 and a steam boiler 8', a brewing unit 9, a mixer 10, and a milk frothing device 11 are arranged within the beverage channel 4. The milk frothing device is fluidically connected to a milk source 12 and to an air source 13. Fluid (e.g. coffee) that is not caught by a vessel (e.g. a cup) on the drip tray 3 enters into an inner space of the drip tray 3. The inner space of the drip tray is fluidically connected to the discharge of the beverage maker via a discharge channel 6. The sensor S for detecting cleaning agent in water is arranged within the discharge channel 6, said sensor S being able to be a conductivity sensor. In this embodiment, the beverage maker has four connection channels 7 that fluidically connect the beverage channel 4 to the discharge channel 6 at different points (e.g. downstream of the hot water boiler 8 and steam boiler 8', on the one hand, and downstream of the milk frothing device 11, on the other hand). The sensor S is arranged downstream of that introduction of a connection channel 7 into the discharge channel 6 that is closest to the discharge 6. Each of the connection channels here has a further sensor S' that is suitable for detecting a cleaning agent in water. The further sensors S' of the respective connection channels are arranged upstream of the inlet opening of the respective connection channel 7 into the discharge channel 6. The control unit of the beverage maker (not shown) is configured to receive measured values from the sensor S of the beverage maker and from the at least one further sensor S' and to regulate a water removal from the water source based on the measured values received.

Example 1—Electrical Conductance Values of Different Cleaning Agents Detected by the Sensor A conductivity sensor was used as the sensor in this example. The conductivity was detected at the sensor depending on a flushing with water or with specific cleaning agent mixtures (see Table).

Table: Conductance values detected by the sensor depending on the cleaning agent used in a cleaning program. Water represents the control here (=no cleaning agent).

It can be seen from the data shown in the table that the individual tested cleaning agents have a considerable difference in electrical conductivity from the electrical conductivity of water from the water source. It can consequently be detected via the sensor whether residues of cleaning agent are still present in the beverage maker. An overdosing or underdosing of the respectively used cleaning agent can additionally be detected on the basis of the conductivity characteristic for each tested cleaning agent.

The water originating from the water source can have a different conductance depending on the region or the water supplier. If the conductance is higher than the conductance indicated in the above table, the conductance for the mixture of water with the respective cleaning

| Medium | Resistance [Ω] | Conductance |
|---|---|---|
| Water* | 511 | 4.4 |
| 1 tablet (1.3 g) coffee cleaner to 1 L | 170 | 13.2 |
| 18 tablets coffee cleaner | 22.5 | 100 |
| 1 tablet (10 gr.) milk cleaner to 1 L | 56 | 40 |
| 3 tablets milk cleaner to 1 L | 29 | 78 |
| 50 ml milk cleaner, liquid, to 1 L | 90 | 25 |
| Milk cleaner, pure | 21 | 107 |
| Descaler mixed with water at 2:3 | 12 | 188 | agent indicated in the above table can accordingly also be higher. The conductance indicated in the table for the water used is therefore not to be considered as an absolute value that, in the case of every conceivable water, stands for the situation that the beverage maker is free of cleaning agent residues. The conductance for water is rather a reference value that has to be determined by each beverage maker depending on its respective water source and via which the other values are calibrated. In this case, the difference between the conductance detected by the sensor and the reference value of water reveals the degree of remaining cleaning agent at that location in the beverage maker at which the sensor is located.

The user can be informed of an overdosing and/or underdosing of cleaning agent, for example, by means of a display unit of the beverage maker.

REFERENCE NUMERAL LIST

1: water source (e.g. water connection or water tank);
2: beverage outlet;
3: drip tray;
4: beverage channel;
5: discharge;
6: discharge channel;
7: at least one connection channel;
8: hot water boiler;
8': steam boiler;
9: brewing unit;
10: mixer;
11: milk frothing device;
12: milk source;
13: air source;
S: sensor
S': at least one further sensor

The invention claimed is:
1. A beverage maker comprising:
a) a water source;

b) a heating device;
c) a beverage outlet;
d) a drip tray below the beverage outlet;
e) a beverage channel that fluidically connects the water source to the beverage outlet;
f) a discharge that is not identical to the beverage outlet;
g) a discharge channel that fluidly connects an inner space of the drip tray to the discharge, and
h) a connection channel which connects the beverage channel to the discharge channel, wherein the discharge channel has a first sensor that is configured to detect a cleaning agent in water, wherein the discharge channel is fluidically connected to the beverage channel upstream of the first sensor via the connection channel, wherein the connection channel has a second sensor that is configured to detect a cleaning agent in water and is arranged at an entry opening of the beverage channel into the connection channel, wherein the beverage maker includes a control unit that is configured to receive measured values from the first sensor and measured values from the second sensor and to regulate a water removal from the water source on the basis of the measured values received from the first and second sensors.

2. A beverage maker in accordance with claim 1, wherein the control unit is configured to stop the liquid removal when the measured values from the first sensor fall below a certain threshold.

3. A beverage maker in accordance with claim 1, wherein the control unit is configured, when a cleaning program has started on the beverage maker and a measured value of the first sensor thereupon
  i) falls below a predefined threshold value, to present a prompt on a display unit of the beverage maker, to supply cleaning agent to the beverage maker, and/or to store an underdosing of cleaning agent during a cleaning program as an event in a memory unit of the beverage maker; and/or
  ii) is in a predefined value range, to present a message at a display unit of the beverage maker that a cleaning program is being carried out, and/or to store a correct dosing of cleaning agent during a cleaning program as an event in a memory unit of the beverage maker; and/or
  iii) exceeds a predefined threshold value, to present a prompt at a display unit of the beverage maker, to not supply cleaning agent to the beverage maker, and/or to store an overdosing of cleaning agent during a cleaning program as an event in a memory unit of the beverage maker.

4. A method of operating a beverage maker, said method comprising:
  a) providing a beverage maker including a water source, a heating device, a beverage outlet, a drip tray below the beverage outlet, a beverage channel fluidically connecting the water source to the beverage outlet, a discharge that is not identical to the beverage outlet, a discharge channel that fluidically connects an inner space of the drip tray to the discharge and that has a first sensor for detecting a cleaning agent in water, and a connection channel which connects the beverage channel to the discharge channel, wherein the discharge channel is fluidically connected to the beverage channel upstream of the first sensor via the at least one connection channel, wherein the connection channel has a second sensor that is configured to detect a cleaning agent in water and is arranged at an entry opening of the beverage channel into the connection channel, and
  b) receiving measured values of the first sensor and measured values of the second sensor by a control unit of the beverage maker; and
  c) regulating a water removal from the water source by the control unit, with the regulation taking place on the basis of the measured values received by the control unit from the first and second sensors.

5. A method in accordance with claim 4, wherein the liquid removal of the beverage maker is stopped by the control unit when the measured values from the first sensor fall below a specific threshold.

6. A method in accordance with claim 4, wherein, when a cleaning program is started on the beverage maker and a measured value thereupon
  i) falls below a predefined threshold value, the control unit presents a prompt to supply cleaning agent to the beverage maker on a display unit of the beverage maker, and/or stores an underdosing of cleaning agent during a cleaning program as an event in a memory unit of the beverage maker; and/or
  ii) is in a predefined value range, the control unit presents a message that a cleaning program is being carried out on a display unit of the beverage maker, and/or stores a correct dosing of cleaning agent during a cleaning program as an event in a memory unit of the beverage maker; and/or
  iii) exceeds a predefined threshold value, the control unit presents a prompt not to supply cleaning agent to the beverage maker on a display unit of the beverage maker, and/or stores an overdosing of cleaning agent during a cleaning program as an event in a memory unit of the beverage maker.

* * * * *